(12) United States Patent
Creighton

(10) Patent No.: US 6,446,544 B1
(45) Date of Patent: Sep. 10, 2002

(54) COOKING UTENSIL

(76) Inventor: Richard W. Creighton, 19 Fine St., San Rafael, CA (US) 94901

( * ) Notice: Subject to any disclaimer, the term of this patent is extended or adjusted under 35 U.S.C. 154(b) by 0 days.

(21) Appl. No.: 09/749,553

(22) Filed: Dec. 28, 2000

(51) Int. Cl.[7] .............................. A47J 27/00; A47J 37/10
(52) U.S. Cl. .............................. 99/339; 99/413; 99/422; 99/425; 99/448
(58) Field of Search ........................... 99/422, 444, 446, 99/339, 448, 410, 413, 417, 425; 220/573.1, 912, 4.01; 126/369, 373.1

(56) References Cited

U.S. PATENT DOCUMENTS

| | | | | |
|---|---|---|---|---|
| 2,093,013 A | * | 9/1937 | Jennings | |
| 3,439,603 A | * | 4/1969 | Reames | 99/413 |
| 3,710,709 A | * | 1/1973 | Roncarelli | 99/345 X |
| 4,485,801 A | * | 12/1984 | Hogdes et al. | 99/446 X |
| 5,511,466 A | * | 4/1996 | Dzibinski | 99/422 |
| 6,196,120 B1 | * | 3/2001 | Reames | 99/413 |

* cited by examiner

*Primary Examiner*—Reginald L. Alexander
(74) *Attorney, Agent, or Firm*—Larry D. Johnson; Craig M. Stainbrook; Johnson & Stainbrook, LLP

(57) ABSTRACT

Cooking Utensil comprising a cooking pan, the pan having a flat circular bottom approximately nine inches in diameter, the pan having an angled rising surface approximately two inches above the circular bottom, the angled rising surface terminating in an annular surface having an outer perimeter of twenty four inches, the annular surface having a five degree slop toward the central nine inch diameter portion, the outer perimeter terminating in a vertical lip approximately two inches tall, the pan being made of anodized aluminum, the pan being alternately made of stainless steel, and the pan having opposing carry handles.

8 Claims, 1 Drawing Sheet

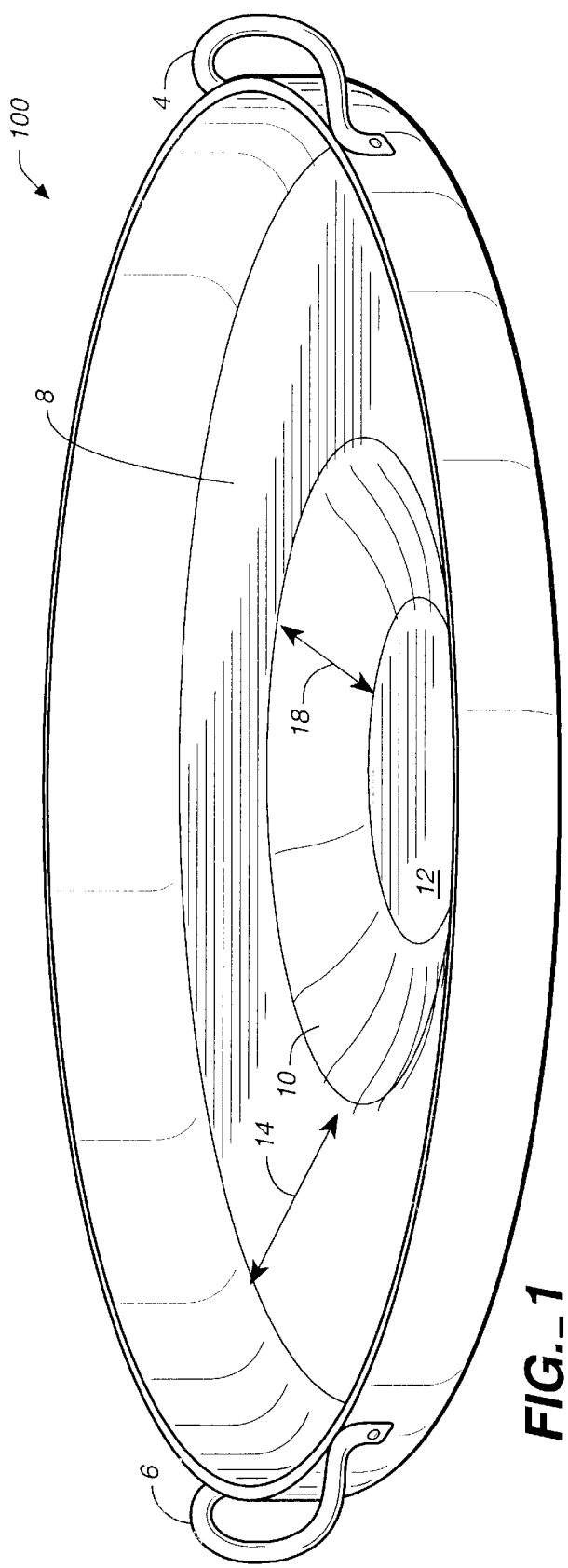
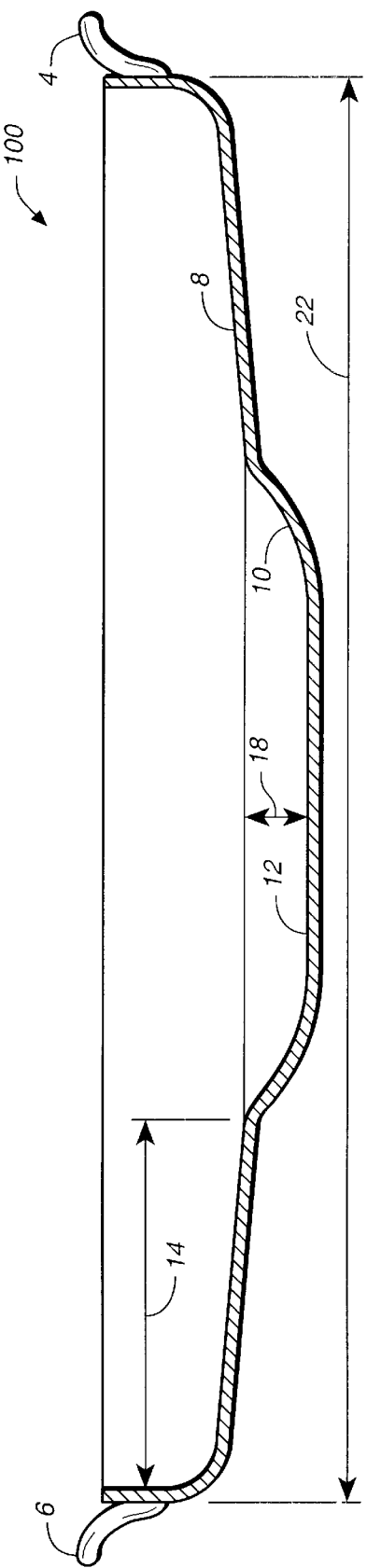

COOKING UTENSIL

BACKGROUND OF THE INVENTION

This invention relates generally to the field of cooking utensil's, and more particularly to a pan type cooking Utensil.

Cooking pans are well known and take many sizes and shapes. They tend however to be circular in shape with integral side walls and some sort of carry handle or handles attached. One type of cooking pan is known as a wok, which used generally to stir fry ingredients quickly.

Unfortunately, when cooking in this manner, there is no choice as to how long each individual ingredient is cooked, since they are all mixed to together. Mr. DuWayne M. Dzibinski, in his U.S. Pat. No. 5,511,466, has tried to address the problem of controlling the cook time of individual ingredients by creating a wok like cooking utensile that has an annular trough integrated into the outer perimeter of the pan thereby allowing the user to store various foods in close proximity to the cooking surface of the pan. Although Dzibinski's design goes a long way toward solving the problem of controlling the cook time of multiple foods within one pan there are significant drawbacks to his design that my present invention has overcome. These include the trough nature of Dzibinski's annular ring as well as the relative size of surface areas and wall heights of the pan. The trough, although useful in prohibiting foods from accidentally falling into the cooking area, does not allow for the easy transfer of foods and juices from the flat storage area to the cooking area. The height of Dzibinski's side wall from cooking area to storage area is excessive in that the stored foods will tend to cool off, as well as preventing the easy sliding transfer of foods from the cooking area back to to the stored area. Finally, Dzibinski's food storage area is quite shallow from front to back thereby minimizing and making impractical the amount of food a person can store on the flat storage area.

SUMMARY OF THE INVENTION

The primary object of the invention is to provide a cooking utensil that allows the user to cook multiple foods within one pan.

Another object of the invention is to provide a cooking utensil that keeps some foods warm while cooking others.

Another object of the invention is to provide a single cooking utensil that can replace multiple cooking utensils.

Other objects and advantages of the present invention will become apparent from the following descriptions, taken in connection with the accompanying drawings, wherein, by way of illustration and example, an embodiment of the present invention is disclosed.

Cooking Utensil comprising: a cooking pan, said pan having a flat circular bottom approximately nine inches in diameter, said pan having an angled rising surface approximately two inches above said circular bottom, said angled rising surface terminating in an annular surface having an outer perimeter of twenty four inches, said annular surface having a five degree slop toward said central nine inch diameter portion, said outer perimeter terminating in a vertical lip approximately two inches tall, said pan being made of anodized aluminum, said pan being alternately made of stainless steel, and said pan having opposing carry handles.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 1 is a perspective view of the present invention

FIG. 2 is a side section view of the present invention

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring now to FIG. 1 we see a perspective view of the cooking utensil of the present invention 100. Flat bottom 12 is approximately nine inches in diameter. A gentle rise 10 of approximately two inches leads to a flat food storage surface area 8 which is approximately six inches from front to back 14. The rim of the pan is approximately two inches tall. Flat food storage area 8 has a five degree downward slant from back to front to allow juices and stored foods to easily travel from the storage area 8 to the cooking area 12. It is important that the transition 10 from the storage area 8 to the cooking area 12 be gradual so that food can be easily shifted from storage to cooking and back again as many times as desired. It is also important that the height distance 18 from the cooking area 12 to the food storage area 8 be approximately two inches because if it is higher, heat from the cooking surface 12 will not transfer properly to the flat storage area 8 and food stored on the flat surface 8 will not stay warm, as is desired. It is important to the present invention that storage area 8 is sufficiently deep from front to back 14 so that it can store generous portions of food around the perimeter of coking surface 12. Handles 4, 6 allow the user to pick up the pan without burning his or her fingers. The present pan can be made of anodized aluminum or stainless steel. FIG. 2 shows a section view of the present invention 100 for further clarification. Notice the Five degree tilt of flat surface 8 so that juices and foods can easily slide down to the cooking area 12. The overall diameter of the present invention is approximately twenty four inches.

In the above illustrated way, a person can cook a variety of foods within one pan, at different times. The foods can be cooked and then easily slid out and up to be temporarily stored and kept warm on the raised flat area surrounding the cooking surface.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A cooking utensil comprising:
   a cooking pan having a flat circular bottom portion providing a food cooking area;
   a gently rising, gradual transition surface connected to and rising above said flat circular bottom portion;

said gradual transition surface terminating without discontinuity in an annular surface providing a flat food storage area and having an outer perimeter, said annular surface having a slope toward said flat circular bottom portion to allow juices and stored foods to be moved from the food storage area to and from the food cooking area; and said outer perimeter terminating in a vertical lip having a opposed handles mounted there to, wherein said gradual transition surface enables food to be slid from the food storage area to the food cooking area and back again as many times as desired.

2. The cooking utensil of claim 1 wherein said flat circular bottom portion is nine inches in diameter.

3. The cooking utensil of claim 1 wherein said gradual transition surface extends two inches above said flat circular bottom portion.

4. The cooking utensil of claim 1 wherein said annular surface has an outer perimeter of twenty four inches.

5. The cooking utensil of claim 1 wherein said annular surface has a five degree slope.

6. The cooking utensil of claim 1 wherein said vertical lip is two inches tall.

7. The cooking utensil of claim 1 wherein said cooking pan is composed of anodized aluminum.

8. The cooking utensil of claim 1 wherein said cooking pan is composed of stainless steel.

* * * * *